United States Patent [19]

Dyott

[11] Patent Number: 4,950,318
[45] Date of Patent: Aug. 21, 1990

[54] METHOD OF JOINING SELF-ALIGNING OPTICAL FIBERS

[75] Inventor: Richard B. Dyott, Orland Park, Ill.

[73] Assignee: Andrew Corporation, Orland Park, Ill.

[21] Appl. No.: 314,318

[22] Filed: Feb. 22, 1989

Related U.S. Application Data

[60] Continuation of Ser. No. 77,388, Jul. 24, 1987, abandoned, which is a division of Ser. No. 778,407, Sep. 20, 1985, Pat. No. 4,755,021, which is a continuation-in-part of Ser. No. 469,977, Feb. 25, 1983, Pat. No. 4,697,876, which is a continuation-in-part of Ser. No. 404,283, Aug. 2, 1982, Pat. No. 4,669,814.

[51] Int. Cl.$^5$ .................... C03B 23/00; C03B 37/10
[52] U.S. Cl. .................... 65/4.21; 65/102; 350/96.21; 156/158
[58] Field of Search ............. 65/4.2, 4.21, 4.3, 3.11, 65/102, 105, 106, 108; 350/96.2, 96.21, 96.22, 96.1, 96.15; 156/158

[56] References Cited

U.S. PATENT DOCUMENTS

| 4,026,693 | 5/1977 | Sato | 65/4.2 |
| 4,179,189 | 12/1979 | Kaminow et al. | 65/3 |
| 4,184,859 | 1/1980 | Maklad | 65/3.2 |
| 4,274,854 | 6/1981 | Pleibel et al. | 65/3 |
| 4,307,938 | 12/1981 | Dyott | 350/96.30 |
| 4,315,666 | 2/1982 | Hicks, Jr. | 350/96.15 |
| 4,325,636 | 4/1982 | Schiffner | 350/96.15 |
| 4,410,236 | 10/1983 | Schiffner | 350/96.15 |
| 4,440,498 | 4/1984 | Sheem | 350/96.15 |
| 4,445,780 | 5/1984 | Burns | 350/96.15 |

FOREIGN PATENT DOCUMENTS

| 56-24306 | 3/1981 | Japan | 350/96.1 |
| 2045458 | 10/1980 | United Kingdom | 65/4.21 |

OTHER PUBLICATIONS

Bendow, Physics of Fiber Optics; Advances in Ceramics, vol. 2; The American Ceramic Society, Inc., Columbus, Ohio; 1981, p. 482.

Mossman, P.; Electronics Letters, 25 Jun. 1981, vol. 17, No. 13, pp. 451–452.

(List continued on next page.)

*Primary Examiner*—Kenneth M. Schor
*Attorney, Agent, or Firm*—Stephen G. Rudisill

[57] ABSTRACT

A method of forming an optical fiber joint between a pair of elongated optical fibers each of which has a longitudinal axis surrounded by a core and cladding having different refractive indices and forming a single-mode light-guiding region, the core and cladding of each fiber having non-circular transverse cross-sections defining two polarization-maintaining axes of birefringence transverse to the longitudinal axis of the fiber. Each of the fibers also has predetermined external flat reference surfaces for locating the core and cladding and the axes of birefringence within each fiber from the exterior geometry of the fiber. The method comprises shaping an elongated glass preform to have a cross-sectional configuration with flat longitudinal surfaces extending along the preform length, which flat surfaces are large-scale complements of the external reference surfaces on the fibers to be joined, such that the preform longitudinal surfaces will mate with the fiber reference surfaces when the preform is drawn down to the scale of the fibers; heating the shaped preform to a softened condition and then drawing the softened preform in a longitudinal direction to reduce the scale of the complementary surfaces so that the cross-sectional configuration of the drawn preform matches the cross-sectional configuration of the external reference surfaces on the fibers to be joined, and so that the preform longitudinal surfaces and the fiber reference surfaces will mate together; cooling the drawn preform and placing the optical fibers to be joined thereon with the ends of the fibers butted together, with the external reference surfaces on the fibers matingly engaging the complementary longitudinal surfaces on the drawn preform; and bonding the fibers to the drawn preform and bonding the abutting ends of the fibers to each other.

5 Claims, 2 Drawing Sheets

OTHER PUBLICATIONS

Andrew Bulletin 8683, "Elliptically Cored Polarization Holding Fiber", 3/82.
Andrew Bulletin 1295, "Polarization Holding Optical Fiber", 4/82.
Andrew Bulletin 1295A, "Polarization Maintaining Optical Fiber", 2/83.
Dyott et al., "Perservation of Polarization in Optical-Fibre Waveguides with Elliptical Cores", Electronics Letters, vol. 15, No. 13, 6/21/79, pp. 380–382.
Schoner et al., "Novel Method for Making Single-Mode Optical Fiber Directional Couplers", Electronics Letters, vol. 18, No. 13, 6/24/82, pp. 566–567.
Bergh et al., "All-Single-Mode Fiber-Optic Gyroscope", Optics Letters, vol. 6, No. 4, 4/81, pp. 198–200.
Andrew Bulletin 1310, "Optical Fiber Sensor Subsystems", 2/83.
Davis, "An Introduction to Fiberoptic Sensors", Laser Focus/Fiberoptic Technology, vol. 18, No. 2, 2/82, pp. 112–115.
Giallorenzi, "Fibre Optic Sensors", Optics and Laser Technology, vol. 13, No. 2, 4/81, pp. 73–78.
Ezekiel et al., "Fiber-Optic Rotation Sensors. Tutorial Review", pp. 2–25 (no publication date).
McMahon et al., "Fiber-Optic Transducers", IEEE Spectrum, 12/81, pp. 24–29.
Cole et al., "Research Update on Fiber Optic Sensors", International Fiber Optics and Communications, vol. 2, No. 2, 3/81, pp. 23–24.
Stokes et al., "All-Single-Mode Fiber Resonator", Optics Letters, vol. 7, No. 6, 6/82, pp. 288–290.
Andrew Bulletin 8717, "Self-Locating Elliptically Cored Fiber with an Accessible Guiding Region", 2/83.
Dyott et al., "Polarization Holding Directional Couplers Using D Fiber", SPIE vol. 479, Fiber Optic Couplers, Connectors, and Splice Technology (1984), pp. 23–27.

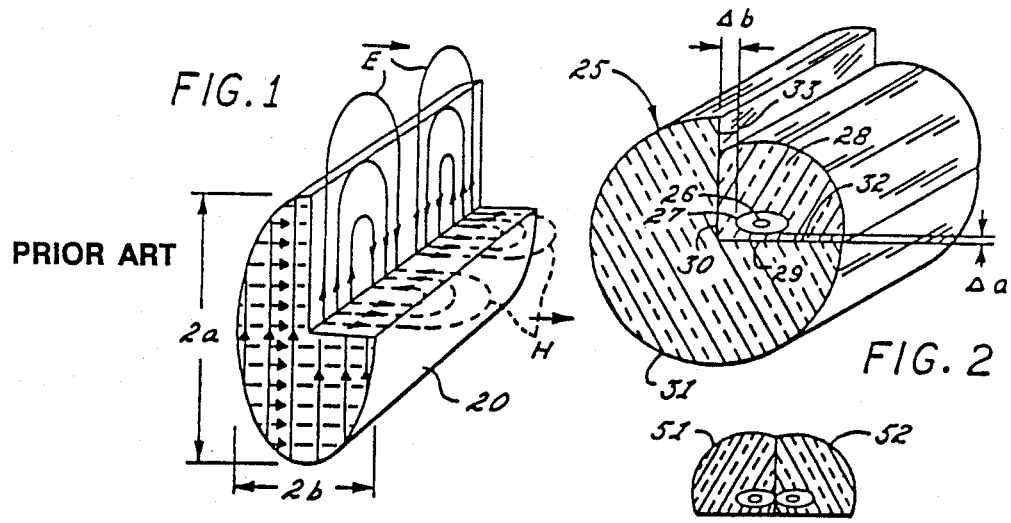
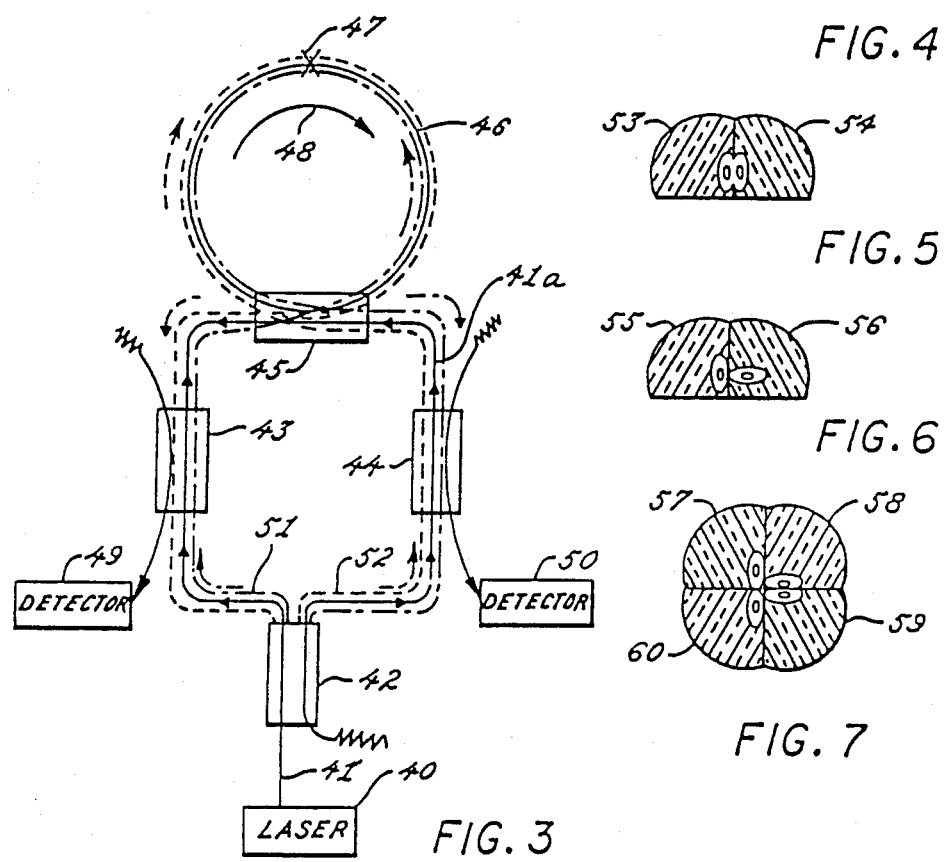

METHOD OF JOINING SELF-ALIGNING OPTICAL FIBERS

This application is a continuation of my patent application Ser. No. 077,388 filed July 24, 1987 and now abandoned, which in turn is a divisional of my application Ser. No. 778,407 filed Sept. 20, 1985, U.S. Pat. No. 4,755,021, for "Self-Aligning Optical Fiber and Fiber-Ring Optical Resonator Using Same," which in turn is a Continuation-In-Part of my application Ser. No. 469,977 filed Feb. 25, 1983, U.S. Pat. No. 4,697,876, for "Fiber-Optic Rotation Sensor," which in turn is a Continuation-In-Part of my application Ser. No. 404,283 filed Aug. 2, 1982, U.S. Pat. No. 4,669,814, for "Self-Aligning Optical Fiber with Accessible Guiding Region."

FIELD OF THE INVENTION

The present invention relates generally to the field of fiber optics, and particularly single-moded and dual-polarization-preserving fiber-optic waveguides.

DESCRIPTION OF RELATED ART

Fiber optics is generally concerned with the transmission of light along a transparent fiber structure which has a higher refractive index than its surroundings. Currently it is possible to manufacture long, continuous strands of optical fiber which may propagate signals without substantial attenuation over long distances. It is also possible to manufacture the fiber structure as an optical waveguide wherein only preselected modes of light propagate in the fiber. By limiting wave propagation through the fiber to a single mode, the bandwidth of the optical fiber may be exceedingly high to provide a high information-transfer capacity.

While the development of optical fibers for telecommunications systems is becoming rather highly advanced, the use of fiber optics for sensing and control systems is still in its early development. In sensing and control systems, a fiber-optic transducer is used that exploits either multi-mode or single-mode light propagation in an optical fiber.

While multi-mode sensors use amplitude variations in the optical signals to sense and transmit the desired information, single-mode sensors use phase variations rather than amplitude variations. The single-mode sensors usually involve mechanisms for altering such properties of the fiber as path length or index of refraction to effect the desired phase variations in the optical signal. In the case of the fiber-optic gyroscopy, the single-mode sensor measures acceleration which inherently alters the propagation of light even though the fiber is not affected. Thus, in contrast to multi-mode sensors, in single-mode sensors the uniformity and mechanism of light propagation and hence the characteristics of the fiber are especially critical.

Single-mode sensors and fiber components such as directional couplers, are sensitive to the state of polarization of the light in the fiber. Thus, for single-mode transducers, it is desirable to use elliptical-core or other kinds of polarization-holding fiber. See, e.g., McMahon et al, "Fiber-Optic Transducers," *IEEE Spectrum*, December 1981, pages 24–27. Most of these polarization-holding fibers are capable of preserving the polarization of signals along two different, usually orthogonal, axes, such as the major and minor axes of an elliptical core.

There are well-known techniques for making long, continuous, single-mode optical fibers. Keck et al. U.S. Pat. No. 3,711,262 issued Jan. 16, 1973, for example, describes the conventional method of producing an optical waveguide by first forming a film of glass with a preselected index of refraction on the inside wall of a glass tube, and then drawing the glass-film combination to reduce the cross-sectional area and to collapse the film of glass to form a fiber having a solid cross-section. As a result of this process, the core is formed from the glass film, and the cladding is formed from the glass tube.

It is also known that multiple core and cladding layers may be deposited on the inside of a preform which is then collapsed and drawn, so that the preform tube becomes a support jacket around the core and cladding layers. Light propagated through a fiber formed in this manner is confined to the guiding region formed by the core and cladding layers and does not significantly interact with the support jacket. Consequently the optical properties of the support jacket can be considerably inferior to the optical qualities of the core and cladding. Details of this process for forming multiple core and cladding layers are disclosed in MacChesney et al., "A New Technique for the Preparation of Low-Loss and Graded-Index Optical Fibers," *Proceedings of the IEEE*, 62, at 1280 (1974), and Tasker and Ench, "Low-Loss Optical Waveguides with Pure Fused $SiO_2$ Cores," *Proceedings of the IEEE*, 62, at 1281 (1974).

It is known that elliptical-core, polarization-preserving optical fibers may be drawn from elliptical-core preforms. The preforms may be manufactured by collapsing a cylindrical preform or tube, with a slight vacuum in the center. Another method of manufacturing an elliptical-core preform is to fabricate the substrate tube to have a wall of non-uniform thickness and then collapse the tube by heating it to the softening point. The surface tension in the shaped wall, which occurs during the collapsing and subsequent drawing steps, causes the resulting fiber core to be elliptical in cross-section, See, e.g., Pleibel et al. U.S. Pat. No. 4,274,854 issued June 23, 1981.

As is known in the literature, e.g., Dyott et al., "Preservation of Polarization in Optical-Fiber Waveguides with Elliptical Cores", *Electronics Letters*, June 21, 1979, Vol. 15, No. 13, pp. 380–382, fibers with elliptical cores and a large index difference between the core and cladding preserve the polarization of fundamental modes aligned with the long and short axes of the ellipse, i.e., modes having their electric fields parallel to the major and minor axes of the ellipse. If the core-cladding index difference and the difference between the lengths of the major and minor axes of the ellipse are sufficiently large to avoid coupling of the two fundamental modes, the polarization of both modes is preserved.

SUMMARY OF THE INVENTION

It is a principal object of the present invention to provide an improved fiber which has its internal guiding region precisely located, along two orthogonal transfer axes, relative to two external reference surfaces on the fiber. In this connection, a related object of the invention is to provide such an improved optical fiber which permits accurate splicing with extremely low losses across the splices.

It is another important object of this invention to provide an improved polarization-holding optical fiber which can be used to form either co-polarized or cross-polarized couplers. Thus, a related object of the invention is to provide such couplers which are capable of coupling signals to and from either or both of the transverse axes of two or more fibers in a single coupler.

It is a further object of this invention to provide an improved optical-fiber resonator which is particularly useful in rotation sensors such as optical-fiber gyroscopes.

Other objects and advantages of the invention will be apparent from the following detailed description in the accompanying drawings.

In accordance with the present invention, the foregoing objectives are realized by an optical fiber comprising a core and cladding having different refractive indices and forming a single-mode guiding region, the outer surface of the fiber having a cross-section forming a pair of orthogonal exterior flat surfaces so that the location of the guiding region can be ascertained from the geometry of the exterior surfaces of the fiber, and the guiding region being offset from the center of gravity of the transverse cross-section of the fiber and located sufficiently close to at least one of said flat surfaces to allow coupling to a guided wave through that surface by exposure or expansion of the field of the guiding region. In the preferred embodiment of the invention, the core also has a non-circular cross-section defining two transverse orthogonal axes, the core having a longer transverse dimension along one of the orthogonal axes than along the other of the axes for guiding two fundamental modes, one of the fundamental modes having an electric field parallel to the axis of the longer transverse dimension and the other of the fundamental modes having an electric field parallel to the axis of the shorter transverse dimension; the difference in the core dimensions along the orthogonal transverse axes and the difference between the refractive indices of the core and cladding are sufficiently large to de-couple the fundamental modes so that the polarization of the two modes is preserved within the fiber; the guiding region is offset from the geometric center of the fiber and located sufficiently close to one side of the surface of the fiber to allow coupling to a guided wave through that one side by exposure or expansion of the field of the guiding region; and the outer surface of the fiber has a non-circular cross-section forming an indexing surface with a predetermined geometric relationship to the guiding region and the orthogonal transverse axes so that the location of the guiding region and the orientation of the axes can be ascertained from the geometry of the indexing surface on the exterior of the fiber.

BRIEF DESCRIPTION OF THE DRAWINGS

FIG. 1, labeled PRIOR ART, is a diagrammatic perspective view, in partial section, illustrating the electric and magnet fields in their preferred directions of polarization in the elliptical core of a single-mode optical fiber waveguide;

FIG. 2 is an end view of an optical fiber waveguide according to one preferred embodiment of the present invention;

FIG. 3 is a schematic illustration of a fiber-ring resonator utilizing the optical fiber waveguide of this invention;

FIG. 4 illustrates a co-polarization coupler utilizing the optical fiber waveguides of this invention;

FIG. 5 illustrates another co-polarization coupler utilizing the optical fiber waveguides of this invention;

FIG. 6 illustrates a cross-polarization coupler utilizing the optical fiber waveguides of this invention;

FIG. 7 illustrates a four-way coupler utilizing the optical fiber waveguides of this invention;

DESCRIPTION OF THE PREFERRED EMBODIMENTS

Figure 8:
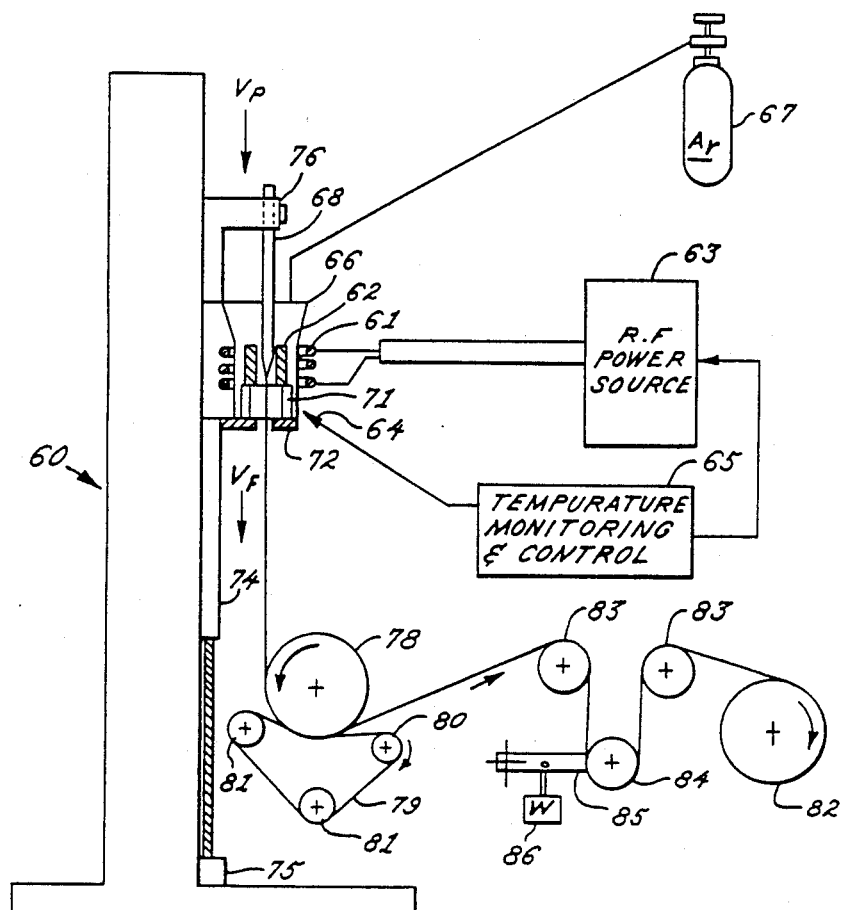
FIG. 8 is a partially schematic side elevation of apparatus for drawing optical fiber according to the present invention.

While the invention is susceptible to various modifications and alternative forms, specific embodiments thereof have been shown by way of example in the drawings and will be described in detail herein. It should be understood, however, that it is not intended to limit the invention to the particular forms disclosed, but, on the contrary, the intention is to cover all modifications, equivalents, and alternatives falling within the spirit and scope of the invention as defined by the appended claims.

Turning now to FIG. 1, there is shown a dielectric core 20 for supporting the propagation of electromagnetic fields E, H in the axial direction. This particular core 20 has an elliptical cross-section with a major diameter $2a$ and a minor diameter $2b$, i.e., $a$ and $b$ are the radii of the core at the major and minor axes, respectively. In a single-mode optical fiber, such a core 20 has a relatively high dielectric constant/index of refraction which tends to confine and guide electromagnetic energy (i.e., light) along the axis of the core. It is known that if the index of refraction of the core 20 is properly chosen in relation to the index of refraction of the surrounding medium, the core dimensions $a$, $b$, and the wavelength of the light, the distribution of the fields E, H will tend to occur in a single, well-defined pattern, or mode. Shown in FIG. 1 is the field pattern for the $_0HE_{11}$ mode.

Single-mode propagation has the advantage of providing well-defined field patterns for coupling the fiber to optical devices. Another advantage is that the attributes of the light propagation, such as phase velocity and group velocity, are relatively constant as the light propagates down the fiber. The group velocity specifies how fast modulation or information travels down the fiber. Thus, for transmitting information over long distances it is important that the group velocity be relatively constant and in particular independent of frequency so that the information will be localized at a specific region rather than becoming "smeared out" as the information travels down the fiber. A single constant phase velocity is important in fiber-optic sensor applications where the phase of a signal in a sensor fiber is compared to the phase of a reference signal in a reference fiber.

Single-mode propagation does not, however, guarantee that the polarization of the signal is fixed in any definite or constant angular relationship with respect to the core 20. Polarization is defined as the direction of the electric field vector E. Thus, in the particular example illustrated in FIG. 1, the light is polarized in a vertical direction.

In single-mode fiber-optic sensors, the phase of the optical signal at the end of a sensor fiber is made a function of an environmental parameter sought to be measured. Typically this phase-shift is introduced by physically lengthening the fiber, or by changing the index of refraction of the core 20. But if the waveguide is not polarization-preserving, the polarization of the light tends to change randomly as the light propagates down the axis of the core 20. Such a random change in polarization results in a fluctuation of the detected signal since a 180° rotation of the direction of polarization is equivalent, at the end of the fiber, to a 180° phase shift. Thus, for sensor applications, the polarization of the light should be maintained at a fixed angular relationship with respect to the fiber as the light propagates down the core.

To maintain or preserve the polarization of a signal in an optical fiber, the optical properties of the fiber must be anisotropic, or in other words a function of the angle of polarization with respect to the fiber. One method of making the optical fiber anisotropic is to make the core 20 have a cross-section which is elliptical or some other non-circular shape which defines two transverse orthogonal axes permitting the de-coupling of waves polarized along those axes. Signals which are launched into such fibers in alignment with one of the transverse axes tend to remain aligned with that axis as the signals are propagated through the fiber, thereby preserving the polarization of the signal.

In the illustrative embodiment of FIG. 2, an optical fiber 25 has an elliptical core 26 with a relatively high index of refraction surrounded by a cladding 27 with a lower index of refraction to produce a high difference in index (e.g., a $\Delta n$ of 0.06). The dimensions and the refractive indices of the core 26 and the cladding 27 are selected to provide a single-mode guiding region. Because of its elliptical shape and high index difference, this guiding region will also hold the polarization of optical signals propagated therethrough in alignment with either axis of the ellipse. That is, the major and minor axes of the elliptical cross-section represent two transverse orthogonal axes which, in combination with the refractive indices of the core and cladding, de-couple light waves polarized along those axes.

Surrounding the guiding region formed by the core 26 and cladding 27 is a support layer 28 which provides the fiber with increased mechanical strength and ease of manipulation. Since this support layer 28 is not a part of the guiding region, its optical properties are not nearly as critical as those of the core 26 and the cladding 27. To prevent light from being trapped in the cladding 27, the support layer 28 has an index of refraction higher than that of the cladding 27.

In accordance with one important aspect of the present invention, an optical fiber with a guiding region having orthogonal polarization-holding axes, i.e., axes of birefringence, is provided with an outer surface having a pair of orthogonal flat surfaces each of which is parallel to one of the polarization-holding axes so that the location of the guiding region and the orientation of the axes of birefringence therein can be ascertained from the geometry of the outer surface of the fiber. Thus, in the illustrative embodiment of FIG. 2, the outer surface of the support layer 28 forms a first flat surface 29 parallel to the major axis of the elliptical guiding region, and a second flat surface 30 parallel to the minor axis of the elliptical guiding region. The flat surface 29 is located sufficiently close to the guiding region that etching away a layer $\Delta a$ from the outer surface of the fiber exposes the major axis of the elliptical guiding region in the surface 29. In this particular embodiment, the other flat surface 30 is spaced farther away from the guiding region, by a distance $\Delta b$, so that the minor axis of the elliptical guiding region is not exposed by merely etching away the thickness $\Delta a$.

One of the significant advantages of the fiber of this invention is that it permits precise, low-loss splices to be made. That is, the guiding regions at two similar fiber ends can be aligned with each other by simply placing the two fiber ends on a common substrate 31 having a groove with orthogonal walls 32 and 33, with the orthogonal flat surfaces on the two fiber ends resting against the orthogonal walls of the substrate. The two fiber ends are butted firmly together and joined to each other and to the substrate by a suitable bonding or encapsulating means, preferably with the addition of a coupling agent in the interface between the two abutting surfaces of the fiber ends. One suitable bonding technique is described in my copending U.S. patent application Ser. No. 594,478 filed Mar. 28, 1984 for "Optical-Fiber Directional Coupler Using Boron Oxide As Interstitial Material."

The common substrate can be formed by shaping an elongated glass preform to have a cross-sectional configuration with longitudinal surfaces which are large-scale complements of the external reference surfaces on the fibers to be joined, and heating the shaped preform to a softened condition and then drawing the softened preform in a longitudinal direction to reduce the scale of the complementary surfaces so the cross-sectional configuration of the drawn preform matches the cross-sectional configuration of the external reference surfaces on the fibers to be joined, and then cooling the drawn preform. The optical fibers to be joined are then placed on the drawn preform with the external reference surfaces on the fibers engaging the complementary longitudinal surfaces on the drawn preform, and are bonded to the preform.

One application where this improved splice is particularly useful is in the fabrication of a high-performance fiber-ring resonator using a closed fiber ring formed by splicing the ends of a length of this fiber. With the orthogonal flat surfaces on the fiber aligned with the internal axes of birefringence, the two ends of the fiber can be spliced with precise alignment of the guiding regions at the two ends of the fiber. As a result, the splice has negligible loss. The closed ring formed by this splice can then be loosely coupled to a fiber carrying the input signal to the ring and the output signal to a detector.

Such a fiber-ring resonator is illustrated schematically in FIG. 3 where a laser 40 supplies an optical signal $S_o$ at a frequency $f_o$ through an optical fiber 41 which forms a loop 41a. The two ends of this loop 41a are coupled through a 3−dB coupler 42 which splits the signal into two components $S_1$ and $S_2$. These two components are propagated in opposite directions through the fiber loop 41a and respective 3−dB couplers 43 and 44, and then on through a 10−dB coupler 45 which provides loose coupling to a sensing ring 46. It is this ring 46 that is formed by the fiber of the present invention, with a low-loss splice 47.

The portions of the two signals $S_1$ and $S_2$ that are coupled into the ring 46 propagate around the ring in opposite directions, and any rotation of the ring causes a shift $\Delta f$ in the frequency of both signals, in opposite directions. That is, if the ring is rotated in the direction indicated by the arrow 48, the signal $S_1$ is shifted to a frequency $(f_o - \Delta f)$, and the signal $S_2$ is shifted to a frequency $(f_o + \Delta f)$. Fractions of these shifted signals are then coupled back into the fiber loop 41a through the 10−dB coupler 45, and propagate in opposite directions through the loop to the 3—dB couplers 43 and 44. Thus, the coupler 43 receives the shifted signal $S_2$ propagating in the opposite direction with a frequency $(f_o+\Delta f)$, and the coupler 44 receives the shifted signal $S_1$ propagating in the opposite direction with a frequency $(f_o-\Delta f)$. These signals are coupled into respective detectors 49 and 50 which convert the optical signals into analogous electrical signals which can be used to measure the magnitude of $\Delta f$. For example, the electrical signals can be fed to a superheterodyne having a local oscillator frequency of $f_o$. If desired, one of the two couplers 43 and 44 and its corresponding detector 49 or 50 could be omitted, although the use of both couplers and detectors offers the advantage of doubling the sensed frequency shift.

The fiber of this invention is also particularly useful in forming various types of couplers, including co-polarization and/or cross-polarization couplers. For example, FIG. 4 illustrates a pair of fibers 51 and 52 arranged to couple signals polarized along the minor axes of the elliptical cores, and FIG. 5 illustrates another pair of fibers 53 and 54 arranged to couple signals polarized along the major axes of the elliptical cores. It will be noted that the coupler of either FIG. 4 or FIG. 5 can be formed from the same pair of fibers. FIG. 6 illustrates yet another coupler that can be formed from a similar pair of fibers 55 and 56, this time coupling signals polarized along the major axis of the elliptical core of one fiber 55 and the minor axis of the elliptical core of the fiber 56.

Three-way and four-way couplers can also be readily formed from the fiber of this invention. Thus, FIG. 7 illustrates a four-way coupler formed from four fibers 57-60, providing two co-polarization couplings (between fibers 57, 60 and fibers 58, 59) and two cross-polarization couplings (between fibers 57, 58 and fibers 59, 60) within a single, integral coupler.

The optical fiber of this invention is preferably made by forming a preform having the desired transverse cross-sectional configuration and drawing an optical fiber from the preform, with the drawing rate and temperature being controlled to produce a fiber with a cross-sectional configuration similar to that of the preform. Thus, the preform can have the same cross-sectional configuration as the fiber 35 illustrated in FIG. 2, though on a larger scale. Such a preform can be made by first forming a cylindrical preform with an elliptical core and cladding located in the center thereof (using techniques known in the art), and then grinding two adjacent sides of the preform to form a cross-section having one flat surface parallel to the major axis of the elliptical core and another flat surface parallel to the minor axis of the elliptical core. An optical fiber is then drawn from the ground preform at a drawing rate and temperature controlled to produce the fiber 35 of FIG. 2, i.e., with a cross-sectional geometry substantially the same as that of the preform but on a smaller scale.

A drawing machine suitable for precise control of the drawing process is shown in FIG. 8. In order to heat the preform to approximately the softening temperature, the central component of the drawing machine is an induction furnace generally designated 60 comprising an external induction coil 61 and an internal graphite toroid 62. The toroid 62 is approximately 4 inches long, an inch in diameter, and has a core hole about a quarter inch in diameter. The induction coil 61 is energized by a radio-frequency power source 63 so that the electrical heating currents are induced in the graphite toroid 62, the resulting temperature being measured by an optical pyrometer 64 and monitored by a control unit 65 adjusting the power source 63. In order to prevent the graphite toroid 62 from burning, the toroid 62 is disposed within a glass cylinder 66 which is filled with a relatively inert gas such as argon from a supply 67.

A preform 68 is fed into the top of the cylinder 66 and passes through the center of the graphite toroid 62. The toroid 62 is heated white hot, causing the preform 62 to soften. The drawing of the fiber 69 from the preform 68 occurs approximately at the center of the toroid 62. The toroid 62 has legs which stand on a support ring 72 attached to the glass cylinder 66.

The critical parameters affecting the drawing process are the feed rate $V_p$ of the preform 68 toward the drawing point, the temperature at the drawing point, and the rate $V_f$ at which the fiber 69 is drawn from the drawing point. The temperature and rate of drawing $V_f$ set the tension at which the fiber 69 is drawn. The rate of feed $V_p$ of the preform is established by a vertical linear slide generally designated 74 having a lead screw driven by a drive motor 75. At the upper end of the slide 74 is a block 76 containing a V groove into which the top of the preform 68 is clamped. The rate of drawing $V_f$ is established by a capstan wheel 78 below the lower end of the glass cylinder 66. The fiber is gripped between the capstan wheel 78 and a flexible plastic belt 79 which is driven by a capstan motor spindle 80 and spaced by two idler rolls 81. The fiber is then wound onto a drum 82 by a take-up mechanism consisting of two fixed idler pulleys 83 and a movable pulley 84 attached to a dancer arm 85 carrying a weight 86. The arm 85 actuates a conventional speed control for the take-up drum 82 so that fiber is wound onto the drum 82 at a tension determined by the weight 86. The fiber is preferably oriented so that the curved surface of the fiber engages the surfaces of the capstan wheel 78 and the drum 82, so that the guiding region of the fiber is located on the side having the larger radius of curvature to minimize the stress on the guiding region.

In one particular example, a preform was made depositing a pure silica cladding and germania core on the inside surface of a silica tube. The cladding and core were formed by the thermal decomposition of silicon tetrachloride and germanium tetrachloride, which were circulated through the bore of the silica tube at approximately 1800° C. in an induction furnace. Diametrically opposed portions of the outside surface of the silica tube were then ground flat, after which the tube was collapsed and lightly drawn to form a preform having an outer surface with a cylindrical cross-section with a diameter of about 2.8 mm. and a central core and cladding of elliptical cross-section. Two adjacent sides of the elliptical-core preform were then ground flat, with the planes of the flat surfaces extending perpendicular to each other and parallel to the major and minor axes of the elliptical core. These flat surfaces were located within a few thousands of an inch of the cladding. Optical fiber was then drawn from this preform at a temperature of about 1550° C. while feeding the preform at a rate of about 0.3 mm/sec. and while pulling fiber from the preform at a rate of about 0.5 m/sec. These parameters were chosen to result in a drawing tension as high as practical without breaking the fiber. The resulting fiber had the cross-sectional configuration illustrated in FIG. 2, with an elliptical guiding region 3.79 microns long in the direction of its major axis and 1.90 microns long in the direction of its minor axis. The dimensions Δa and Δb in FIG. 2 were 7.86 microns and 5.24 microns, respectively. The shape of the cross-section was retained as the preform was drawn into a fiber due to the high drawing tension, the relatively small diameter of the preform, and the precise temperature and localized heating of the induction furnace.

Figure 9:
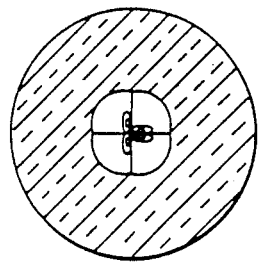
FIG. 9 is a transverse cross-section of a unitary directional coupler made according to the invention.

A unitary coupler can be formed by etching two or more of the fibers of FIG. 2 along the desired "interaction length," i.e., the length along which it is desired to couple the fields of the two fibers. The etching is effected with a 10% concentration of hydrofluoric acid which is allowed to remain in contact with the fibers for about fifty minutes and then removed with distilled water. The etching exposes the cladding on at least one flat side of each fiber along the desired length. The fibers are then fed, with their flat sides facing each other, through a 40-mm length of a Vycor tube having a wall thickness of 0.2 mm and with a bore sufficient to accommodate both fibers with about a five-micron clearance. The etched portions of the fibers are aligned with each other in about the center of the Vycor tube. The fibers extending from each end of the Vycor tube are then clamped to hold them in a stable position while a vacuum of about 17 inches of mercury is applied to both ends of the tube. The tube is then heated until the central region of the tube is observed to collapse onto the fibers. A four-way coupler of the type shown in FIG. 7, formed by the method described above, is shown in FIG. 9. The four fibers 57–60 are encapsulated by the surrounding Vycor tube 90. The coupler can be diffusion-tuned (diffusion tuning is described in more detail in copending U.S. application Ser. No. 755,929 assigned to the assignee of the present invention) with the ends of two of the fibers at one end of the coupler receiving a light signal via an LED, and the ends of the fibers at the other end of the coupler connected to photoelectric detectors with their outputs connected to separate channels of a single chart recorder. For example, the Vycor tube can be heated to a temperature of about 1500° C. in bursts of about two seconds each. After each heat burst, the traces on the chart recorder are examined, and the heating bursts are stopped when the traces on the chart recorder indicate the desired power-splitting ratio.

Although the invention has been described with particular reference to a fiber having an elliptical guiding region, which forms orthogonal axes of birefringence by the geometry of the physical shape of the guiding region, the invention can also be used to advantage with fibers having stress-induced axes of birefringence. In this case, the stress applied to the fiber to produce the birefringence must have a definite orientation relative to the flat surfaces on the exterior of the fiber so that the internal axes of birefringence can be accurately determined from the external flat surfaces The invention can also be used to advantage with a circular-cored fiber which is not polarization-holding but which has a guiding region offset from the center of gravity of the transverse cross-section of the fiber and located sufficiently close to at least one of said flat surfaces to allow coupling to a guided wave through that surface by exposure or expansion of the field of the guiding region by providing the fiber with a pair of orthogonal exterior surfaces which have a predetermined relationship to the physical location of the guiding region, the guiding region can be accurately located from the external geometry of the fiber so that such fibers can be spliced with a high degree of accuracy.

As can be seen from the foregoing detailed description, this invention provides an improved polarization-holding optical fiber which has its internal guiding region precisely located, along two orthogonal transverse axes, relative to two external reference surfaces on the fiber. These external reference surfaces can also be used to precisely locate internal axes of birefringence in a polarization-holding fiber. Because the internal guiding region can be precisely located from the external reference surfaces on the fiber, extremely accurate splices can be formed with low losses across the splices. The polarization-holding fiber can be used to form either co-polarized or cross-polarized couplers, with the signals being coupled to and from either or both of the transverse axes of birefringence, of two or more fibers in a single coupler. This invention also provides an improved optical-fiber resonator which is particularly useful in rotation sensors such as optical fiber gyroscopes.

I claim as my invention:

1. A method of forming an optical fiber joint between a pair of elongated optical fibers each of which has a longitudinal axis surrounded by a core and cladding having different refractive indices and forming a single-mode light-guiding region, the core and cladding of each fiber having non-circular transverse cross-sections defining two polarization-maintaining axes of birefringence transverse to said longitudinal axis of said fiber, each of said fibers also having predetermined external flat reference surfaces for locating the core and cladding and said axes of birefringence within said each fiber from the exterior geometry of the fiber, said method comprising, shaping an elongated glass preform to have a cross-sectional configuration with flat longitudinal surfaces extending along the preform length, which flat surfaces are large-scale complements of said external reference surfaces on the fibers to be joined, such that said preform longitudinal surfaces will mate with said fiber reference surfaces when said preform is drawn down to the scale of said fibers, heating the shaped preform to a softened condition and then drawing the softened preform in a longitudinal direction to reduce the scale of said complementary surfaces so that the cross-sectional configuration of the drawn preform matches the cross-sectional configuration of said external reference surfaces on the fibers to be joined, and so that the preform longitudinal surfaces and the fiber reference surfaces will mate together, cooling the drawn preform and placing the optical fibers to be joined thereon with the ends of the fibers butted together, with said external reference surfaces on the fibers matingly engaging said complementary longitudinal surfaces on the drawn preform, and bonding said fibers to the drawn preform and bonding the abutting ends of said fibers to each other.

2. The method of claim 1 wherein said preform and said fibers joined thereon have about the same coefficients of thermal expansion.

3. The method of claim 1 wherein each of said fibers has a pair of orthogonal external reference surfaces, and said preform is shaped to form a longitudinal groove with orthogonal side walls so that in the drawn preform said orthogonal side walls are complementary to said orthogonal reference surfaces.

4. A method of forming an optical fiber joint as set forth in claim 1 wherein the transverse cross-section of said guiding region is symmetrical about only a single transverse axis of said fiber, said exterior flat surfaces being orthogonal and intersecting at a point on said single transverse axis.

5. The method of claim 1 wherein said core has a non-circular cross-section defining two transverse orthogonal axes of birefringence, said core having a longer transverse dimension along one of said orthogonal axes than along the other of said axes for guiding two fundamental modes of light propagation, the difference in the core dimensions along said orthogonal transverse axes and the difference between the refractive indices of said core and cladding being sufficiently large to de-couple said fundamental modes so that the polarization of said modes of light propagation is maintained within the fiber.

* * * * *